Aug. 30, 1938.   J. E. JOHNSON   2,128,252
MATERIAL FEEDING MACHINE
Filed Nov. 29, 1935   2 Sheets-Sheet 1
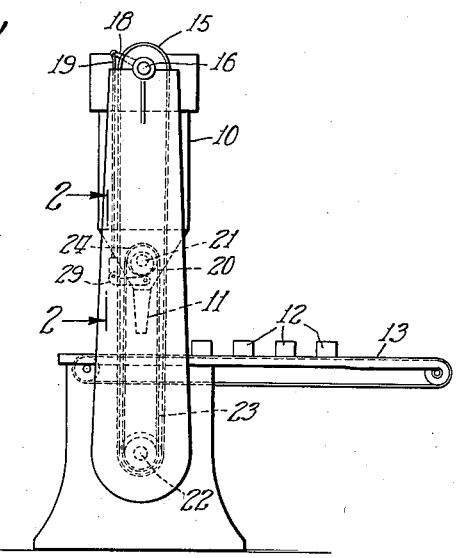
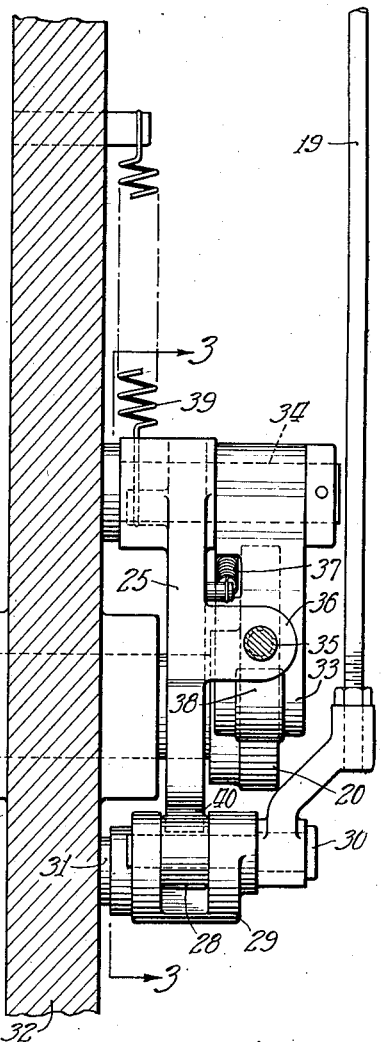
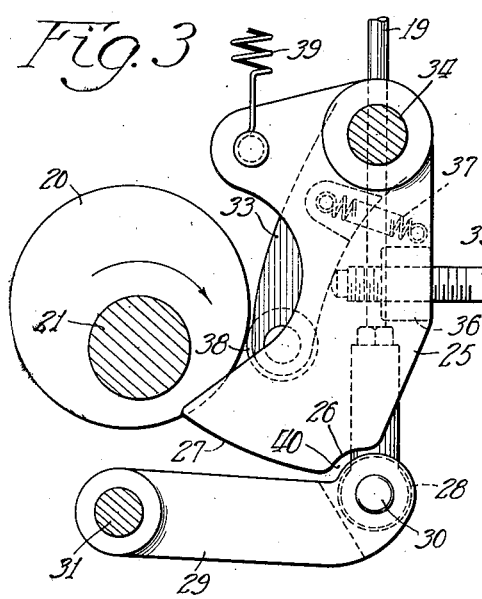
Inventor:
John E. Johnson
By Roland C. Rehm
Atty.

Aug. 30, 1938.   J. E. JOHNSON   2,128,252
MATERIAL FEEDING MACHINE
Filed Nov. 29, 1935   2 Sheets-Sheet 2

Inventor:
John E. Johnson
By Roland C. Rehm
Atty.

Patented Aug. 30, 1938

2,128,252

UNITED STATES PATENT OFFICE 2,128,252

MATERIAL FEEDING MACHINE

John E. Johnson, Chicago, Ill., assignor to William Ayer McKinney, Winnetka, Ill.

Application November 29, 1935, Serial No. 52,112

6 Claims. (Cl. 221—103)

This invention relates to apparatus for feeding predetermined quantities or weights of materials and, among other objects, aims to provide improved means for controlling said apparatus to maintain uniformity of operation.

The nature of the invention may be readily understood by reference to an illustrative embodiment thereof shown in the accompanying drawings.

In said drawings:

Fig. 1 is an elevation of the apparatus;

Fig. 2 is a fragmentary sectional elevation taken approximately on the plane 2—2 of Fig. 1 showing details of the adjusting mechanism;

Fig. 3 is a detail section taken on the plane 3—3 of Fig. 2;

Figure 5:
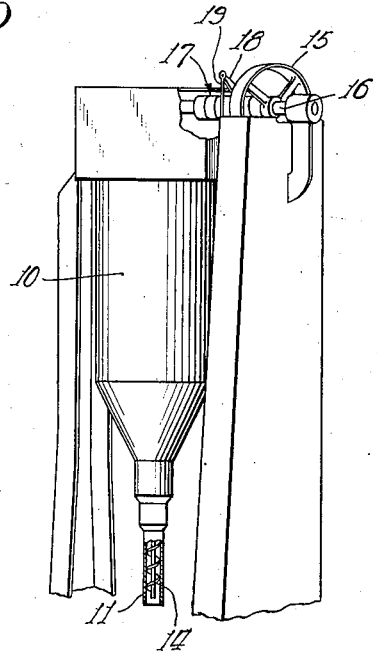
Fig. 5 is a perspective view of the upper portion of the apparatus.

The invention is here shown embodied in apparatus for delivering predetermined quantities of granular or powdered materials. In the present instance the material is carried in a hopper 10 and discharged through spout 11 into containers 12 which are successively brought under the spout by a conveyer belt 13. Control of the discharge through spout 11 is effected by a rotary measuring screw 14 adapted to insure uniform delivery proportional to the rate of rotation of the screw. Under uniform conditions the screw is adapted to deliver a predetermined amount of material upon a predetermined number of rotations of the screw. Adjustment of the weight of a charge of material delivered is effected by regulating the number of revolutions of the screw.

Preferably the hopper 10 is supplied with a stirring and agitating device which prevents arching of the material in the hopper and insures adequate flow to the feeding screw. The latter may be driven by any appropriate mechanism here represented by the pulley 15 and shaft 16 and an interposed clutch 17 operated by lever 18. The clutch is advantageously of the type provided with a brake which immediately arrests rotations of the screw on release of the clutch. The details of the foregoing mechanism are well known and need not be further described.

Because of frequent variations in the character of a given material due particularly to variations in temperature, atmospheric conditions, and moisture content, most materials do not bulk nor flow uniformly; and a predetermined rotation of feeding screw 14 does not therefore feed successive charges of absolutely uniform weight. Departure from the standard or predetermined weight is quite as serious whether the contents of the given package 12 are under a stated weight as where they are in excess of that weight. Loss results in the rejection of underweight packages or because of the excess material in overweight packages.

While the mechanism for periodically operating the clutch 17 has generally permitted adjustment to vary the number of revolutions of the screw, such adjustment has been difficult and impractical, requiring for example that the machine be stopped while the adjustment is made. In the illustrative apparatus it is possible quickly to make adjustments while the machine is in operation and as often as the weights of test charges show adjustment to be necessary. Several adjustments are frequently necessary before departure from normal can be corrected and this may be effected easily and without interruption of production, simply by weighing a succession of test charges after successive adjustments until appropriate correction has been made.

In the present instance clutch 17 is a normally open clutch, being engaged only upon depression of its operating lever 18 by actuating rod 19. The latter is periodically operated by cam 20 carried on shaft 21. The latter shaft is driven from the driving shaft 22 from pulley 15 by means of a chain 23 and sprocket 24. Cam 20 is therefore driven at a rate of speed proportional to that of pulley 15 and feeding screw 14 and therefore all variations in speed of rotation of screw 14 occur also in cam 20.

Clutch operating rod 19 is depressed by an oscillating cam 25 provided with a cam surface 26 which actually effects the depressing movement and an arcuate surface 27 which holds clutch 17 in engaged condition. The length of time during which the surface 27 is operative to hold the clutch engaged determines the number of rotations of screw 14 and therefore the weight of the charge delivered. The aforesaid adjustment in the predetermined number of rotations of screw 14 is effected by varying the length of time during which the curved surface 27 is operative. As shown in Fig. 3, the cam 25 engages a cam roller 28 carried on link 29, one end of which is connected as at 30 to rod 19 and the other end pivotally supported at 31 to a portion of the machine frame 32.

Oscillation of cam 25 is effected by means of an adjustable cam engaging arm 33 pivoted on the pin 34 to which cam 25 is also pivoted. The latter carries an adjusting screw 35 threaded through a projecting lug 36 which is adapted to adjust the angular relationship between arm 33 and cam 25. A spring 37 connected to the arm 33 and cam 25 respectively is adapted to pull the two together and hold the arm in engagement with the end of screw 35. The arm 33 carries a cam roller 38 against which cam 20 operates. Spring 39 connected at one end to cam 25 and at the other end to the machine frame 32 serves to pull cam roller 38 into engagement with cam 20 and serves to effect the return movement of cam 25.

Adjustment of the period of time during which the clutch 17 is held engaged (through depression of rod 19) is in this instance effected by varying the angular relation between arm 33 and cam 25 by means of screw 35. For example, if it be desired to shorten the period of clutch engagement, the screw is retracted so as to allow an increase in the distance 40 between cam 25 and roller 28 at the beginning of the forward stroke of cam 20. This prolongs the period during which cam 25 is idle and therefore reduces the distance and therefore the time during which the roller 28 is held in depressed condition by the surface 27 of the cam. On the other hand, if it be desired to increase the weight of the charge, the screw 35 is advanced so as to increase the angular separation between arm 33 and cam 25 so that the latter is in engagement with roller 28 for a longer period of its oscillation.

It should be noted that Fig. 3 shows the cam 25 just at the end of its idle period of oscillation where it is about to engage roller 28. The distance 40 is the maximum separation between cam 25 and roller 28 and occurs when the low point of cam 20 is in engagement with cam roller 38.

Figure 4:
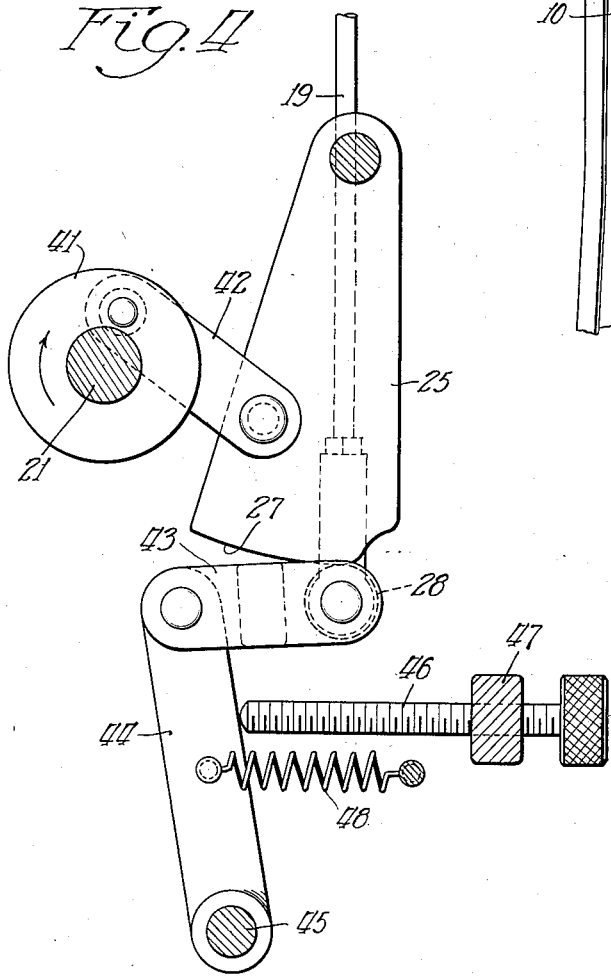
Fig. 4 is a sectional elevation similar to that of Fig. 3 showing a different form of adjusting mechanism.

A somewhat different adjusting mechanism is illustrated in Fig. 4 wherein the cam 20 is replaced by a crank disk 41 which serves to oscillate cam 25 through the connecting link 42. Adjustment of the period of active operation of cam 25 is in this instance effected by moving roller 28 toward and away from the cam. In this instance roller 28 is carried by a link 43 pivoted at one end to rod 19 and at the other end to arm 44 pivoted at 45 on the machine frame 32. The relative position of roller 28 and cam 25 is adjusted by screw 46 passing through a threaded lug 47 on the machine frame. A spring 48 connected at one end to arm 44 and at the other end to the machine frame serves to hold arm 44 in operative engagement with adjusting screw 46. Reduction of the period of time during which the clutch is held in engagement by the surface 27 of the cam is also effected in this case by retracting screw 46 so as to increase the proportion of angular movement during which cam 25 is out of contact with rollers 28 and therefore idle. On the other hand, increase in the period of engagement of the clutch is effected by advancing screw 46 so that cam roller 28 will be engaged sooner in the cycle of oscillation of cam 25 and will therefore be held depressed for a longer period by cam surface 27.

It should be noted that in Fig. 4 the relation of the cam and cam roller are shown in a different portion of the cycle than in Fig. 3, the roller 28 having just been depressed so that the clutch has just been engaged and will remain engaged during the period of contact between surface 27 and roller 28.

It will be apparent from the foregoing that variation in the speed of the driving mechanism does not produce any alteration in the weight of the charge since such variation equally affects screw 14 and the period of oscillation of cam 25. The number of rotations of the screw for each oscillation of the cam would remain the same. In this connection it should be noted that the spacing between successive containers or packages on belt 13 should correspond with the frequency of operation of screw 14 so as to bring a container in registry with spout 11 upon each discharge of material. This of course is not essential when the containers are inserted and held under the spout by hand and then laid upon the conveying belt. At relatively frequent intervals the containers are weighed to determine departure from standard weight and appropriate adjustments are made as aforesaid without interruption of the machine.

Obviously the invention is not limited to details of the illustrative mechanism since these may be variously modified. Moreover, it is not indispensable that all features of the invention be used conjointly since various features may be used to advantage in different combinations and subcombinations.

Having described my invention, I claim:

1. In apparatus for delivering predetermined weights of granular materials and the like, feed adjusting mechanism comprising in combination a supply hopper, a rotary screw for delivering material from said hopper at a rate proportional to the rate of rotation of said screw, mechanism for rotating said screw including a clutch for connecting and disconnecting said mechanism and said screw, a clutch operating rod, a swinging cam adapted periodically to depress said rod to engage said clutch, said cam having an elongated cam surface for holding said clutch engaged, and means for varying the separation of said cam and rod while the apparatus is in operation to vary the period during which said clutch is held engaged, and means operated by said driving mechanism for oscillating said cam at a rate proportional to the rate of rotation of said screw.

2. In apparatus for delivering predetermined weights of granular materials and the like, feed adjusting mechanism comprising in combination a supply hopper, a feeding device adapted to deliver material at a rate proportional to its rate of movement, mechanism for driving said feeding device including a clutch for connecting and disconnecting said feeding device for its driving mechanism, a clutch operating element, an oscillating cam adapted periodically to depress said element and hold the same in depressed condition to effect the delivery of a charge of material, and means for varying the separation of said cam and element to vary the period of engagement of said clutch, and means operated by said driving mechanism for oscillating said cam at a rate proportional to the rate of operation of said feeding device.

3. Apparatus for delivering controlled weights of granular materials and the like comprising in combination a feeding device adapted to deliver a charge of material which is proportional to the rate and duration of movement of the feeding device, mechanism for driving said feeding device including a clutch for connecting and disconnecting said feeding device from its driving mechanism to resume and interrupt the feeding operation, clutch operating means, a moving actuating member for periodically operatively engaging said operating mechanism to release said clutch during the period of its said operative engagement, and mechanism capable of adjustment during the operation of said clutch operating means for varying the period of operative engagement of said member with said clutch operating means to effect an adjustment of the charges of material being delivered by said feeding device.

4. In apparatus for delivering predetermined weights of granular materials and the like, feed adjusting mechanism comprising in combination a supply hopper, a feeding device adapted to deliver material at a rate proportional to its rate of movement, mechanism for driving said feeding device including a clutch for connecting and disconnecting said feeding device from its driving mechanism, a clutch operating element, an oscillating cam adapted periodically to operate said element to engage said clutch and to hold said clutch in engagement, and means for relatively adjusting said element and cam toward and away from each other to vary their period of operative engagement.

5. In apparatus for delivering predetermined weights of granular materials and the like, feed adjusting mechanism comprising in combination a supply hopper, a periodically operating measuring screw for discharging predetermined quantities of material, a clutch for stopping and starting said measuring screw, means for driving said measuring screw at a uniform rate, clutch operating mechanism including periodically operating clutch releasing means for periodically engaging and releasing said clutch, said means including an oscillating cam, and means to vary the amplitude of oscillation of said cam to adjust the period of engagement of said clutch.

6. In apparatus for delivering predetermined weights of granular materials and the like, feed adjusting mechanism comprising in combination a supply hopper, a periodically operating feeding device for discharging predetermined quantities of material, a clutch for stopping and starting said feeding device, means for driving said feeding device at a uniform rate, clutch operating mechanism including an oscillating cam for engaging and releasing said clutch and means for adjusting the oscillations of said cam to vary the period of engagement of said clutch and thereby the weight of material discharged.

JOHN E. JOHNSON.